(12) United States Patent
Donnelly

(10) Patent No.: US 10,119,038 B2
(45) Date of Patent: Nov. 6, 2018

(54) PATINA SOLUTION, METHOD FOR PRODUCING PATINA ON OBJECT, AND PATINA KIT

(71) Applicant: PatinaNow, LLC, Hinsdale, IL (US)

(72) Inventor: Gregory B. Donnelly, Hinsdale, IL (US)

(73) Assignee: PatinaNow, LLC, Hinsdale, IL (US)

( * ) Notice: Subject to any disclaimer, the term of this patent is extended or adjusted under 35 U.S.C. 154(b) by 0 days.

(21) Appl. No.: 15/148,790

(22) Filed: May 6, 2016

(65) Prior Publication Data

US 2016/0325296 A1 Nov. 10, 2016

Related U.S. Application Data

(60) Provisional application No. 62/159,010, filed on May 8, 2015.

(51) Int. Cl.
| | | |
|---|---|---|
| C09D 7/00 | (2018.01) |
| C09D 5/08 | (2006.01) |
| B05B 11/00 | (2006.01) |
| C09D 7/43 | (2018.01) |
| C09D 5/28 | (2006.01) |

(52) U.S. Cl.
CPC ............... *C09D 7/002* (2013.01); *C09D 5/28* (2013.01); *C09D 7/43* (2018.01)

(58) Field of Classification Search
None
See application file for complete search history.

(56) References Cited

U.S. PATENT DOCUMENTS

| | | | |
|---|---|---|---|
| 2,760,890 A | 8/1956 | Kosmos et al. | |
| 3,473,970 A | 10/1969 | Robey et al. | |
| 3,497,401 A * | 2/1970 | Whitman ................ C23C 22/52 | |
| | | | 148/269 |
| 4,325,177 A | 4/1982 | DePoorter | |
| 4,780,275 A * | 10/1988 | Grefkes ..................... C22C 9/06 | |
| | | | 420/485 |
| 4,810,362 A * | 3/1989 | Sutton ........................ C10L 9/00 | |
| | | | 208/191 |
| 5,160,381 A | 11/1992 | Gervais | |
| 5,344,671 A | 9/1994 | Wottrich | |
| 6,176,905 B1 | 1/2001 | Priggemeyer et al. | |
| 2006/0165899 A1 | 7/2006 | Greenberg | |
| 2007/0079906 A1 | 4/2007 | Leuchte | |
| 2012/0000412 A1 | 1/2012 | Woods | |
| 2012/0027993 A1 | 2/2012 | Schmid et al. | |
| 2015/0376136 A1* | 12/2015 | Chumakova ............ A23L 33/10 |
| | | | 514/270 |

FOREIGN PATENT DOCUMENTS

| | | | |
|---|---|---|---|
| CA | 2045919 A1 | 12/1992 | |
| DE | 102005034432 A1 | 2/2007 | |
| GB | 246380 * | 1/1926 | ............... C09G 1/18 |
| JP | H01-268879 A | 10/1989 | |

OTHER PUBLICATIONS

Bell, Journal of the Royal Society of Arts: 43: 555 1 page (May 3, 1895).
Klingenberg, "Vinegar and Salt Patina—Jewelry Making Journal," http://jewelrymakingjournal.com/vinegar-and-salt-patina/ 16 pages (Accessed Mar. 11, 2015).
Rast, Elfshot Sticks and Stones, "Elfshot: Patinating Copper Experiments," http://elfshotgallery.blogspot.com/2009/07/patinating-copper-experiments 8 pages (Jul. 22, 2009).
Wikihow, "4 Ways to Antique Brass," https://www.wikihow.com/Antique-Brass 9 pages (Accessed Mar. 11, 2015).

* cited by examiner

*Primary Examiner* — Shamim Ahmed
(74) *Attorney, Agent, or Firm* — Leydig, Voit & Mayer, Ltd.

(57) ABSTRACT

Compositions, methods, and kits for treating a surface of an object made of copper or a copper alloy to produce a patina thereon. One composition includes a mild acid solution and a powdered salt in a concentration of up to about one pound per gallon of mild acid solution. One method includes treating a surface of an object made of copper or a copper alloy by applying a patina composition to the surface, the patina composition comprising a mild acid solution and a powdered salt in a concentration of up to about one pound per gallon of mild acid solution, allowing the patina composition to remain in contact with the surface for a predetermined amount of time sufficient to permit the patina composition to chemically react with the copper or copper alloy surface to produce patina, and applying water to the surface to remove residual patina composition from the surface.

12 Claims, 4 Drawing Sheets
(3 of 4 Drawing Sheet(s) Filed in Color)

PATINA SOLUTION, METHOD FOR PRODUCING PATINA ON OBJECT, AND PATINA KIT

CROSS-REFERENCE TO RELATED APPLICATIONS

This patent application claims the benefit of priority to U.S. Provisional Patent Application No. 62/159,010, filed on May 8, 2015, and entitled "Patina Solution, Method for Producing Patina on Object, and Patina Kit," which is incorporated in its entirety herein by reference.

TECHNICAL FIELD

This patent disclosure relates to a patina solution, a method for producing a patina on an object made from copper or a copper alloy, and a kit for carrying out steps of such a method.

BACKGROUND

When exposed to oxygen in the air, copper surfaces undergo a chemical reaction called oxidation. This reaction causes a fine crust or thin film to develop that constitutes a thin green protective layer of basic copper compounds (e.g., copper carbonate) referred to as patina. Patina can act to protect the original metal underneath it from further corrosion.

It can sometimes take several decades for this natural patination process to occur, depending on the environmental influences. For example, it took nearly thirty years for the Statue of Liberty to change from its original copper color to the iconic green that it is today.

Thus, while the end result is desirable and frequently found to be aesthetically pleasing, newly-installed architectural elements made from copper must undergo a series of color variations during the patination process and be subjected to conditions causing oxidation for a relatively long timeframe in order to achieve the desired visual effect of natural patina. Furthermore, repairing copper architectural elements that bear a patina can be difficult to perform in a way that allows the new replacement piece to be an appropriate color match so as to blend in with the surrounding portion of the copper architectural element being repaired.

Various reactive patina solutions or patina imitation treatments have been proposed which seek to imitate a natural patina but are capable of being produced in an accelerated timeframe. However, the prior approaches do not always produce a patina that favorably compares with a naturally-produced patina when considering its layer quality or coloration. Also, some prior reaction solutions are toxic, relatively costly to produce, and/or difficult to store. Furthermore, some patination processes can be complicated and difficult to perform.

As such, there is a continued need in the art to provide a patina solution for producing a patina on copper surfaces that is non-toxic and relatively simple to use in patination processes. Furthermore, there is a continued need for a process for producing a patina on copper surfaces in a short period of time (e.g., within a week) that more closely replicates the appearance of a naturally-produced patina occurring over years.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

BRIEF DESCRIPTION OF THE VIEWS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1:
FIG. 1 is a view of an architectural element in the form of a gutter downspout that is made from copper, the upper portion thereof having been weathered for a period of time and the lower portion thereof having received a single patination treatment using an embodiment of a method of producing a patina on an object made from copper or a copper alloy following principles of the present disclosure.

Further and alternative aspects and features of the disclosed principles will be appreciated from the following detailed description and the accompanying views. As will be appreciated, the principles related to patina solutions, methods for producing a patina on an object made from copper or a copper alloy, and kits for carrying out steps of a method for producing a patina that are disclosed herein are capable of being carried out in other and different embodiments, and capable of being modified in various respects. Accordingly, it is to be understood that the following detailed description is exemplary and explanatory only and does not restrict the scope of the disclosed principles.

In embodiments, a patina solution made following principles of the present disclosure includes a suitable acid, such as vinegar, for example, and a powdered salt. In embodiments, a patina solution made following principles of the present disclosure can be used in a method for producing a patina on a surface of an object made of copper or a copper alloy. For example, in embodiments, the copper surface is cleaned, and the copper surface is treated with a coating of a patina solution that is made following principles of the present disclosure. After allowing a predetermined amount of time to elapse (e.g., 24 hours) in which the coating of the patina solution chemically reacts with the copper surface to produce patina and portions of which mechanically adhere to the copper surface, the treated copper surface is set by applying water thereto. Residual patina solution can thereby be washed away from the treated copper surface such that the accelerated patination caused by the patina solution substantially stops. The treated copper surface bears a patina caused by the patina solution and can continue to further develop more patina naturally. In embodiments, a patina kit constructed according to principles of the present disclosure can include a patina solution made following principles of the present disclosure, a suitable receptacle for storing the patina solution, and a suitable applicator for applying the patina solution to a surface to be treated with the patina solution.

Embodiments of a patina solution made following principles of the present disclosure contain a reactive component therein which reacts with the copper surface to form basic copper compounds comprising a patina layer. Therefore, a patina, which otherwise often forms naturally only over long periods of time, can be produced in a short period of time (e.g., 24 to 48 hours) which has an appearance similar to that of a natural patina. The rate of this reaction step can vary, depending on the condition of the surface being treated. The subsequent natural chemical reactions that a treated copper surface continues to undergo can help to enhance the appearance of the patina on the treated copper surface and strengthens the entire patina layer.

In embodiments of a patina solution made following principles of the present disclosure, the patina solution can be configured to produce a patina on a surface of an object made of copper or a copper alloy in a relatively short time period (e.g., within a twenty-four hour time period). In embodiments, the patina solution can include a mild acid, powdered salt, and a thickener. In embodiments, the patina solution can comprise an aqueous solution including the mild acid, the powdered salt, and the thickener. Advantageously, embodiments of a patina solution following principles of the present disclosure are non-toxic and are very stable with a long shelf life.

In embodiments of a patina solution made following principles of the present disclosure, the mild acid comprises a suitable vinegar. In embodiments, the vinegar comprises an aqueous solution of water and acetic acid in a suitable concentration. For example, in embodiments, the vinegar can have an acidity by volume in a range between three percent and about seven percent, for example. In embodiments, the vinegar can have a suitable pH, such as a pH in a range between two and three, and in a range between about 2.3 and 2.6 in yet other embodiments. In some embodiments, the mild acid comprises distilled white vinegar with about five percent acidity by volume.

In embodiments of a patina solution made following principles of the present disclosure, the powdered salt can be any suitable salt. In embodiments, the powdered salt comprises sodium chloride. In embodiments, the powdered salt can include a colorant, such as red or orange colorant, for example. Preferably, the powdered salt is substantially free of toxic substances, but, in embodiments, a powdered salt comprising sodium chloride can have trace amounts of a variety of substances as will be appreciated by one skilled in the art.

In embodiments, the salt is ground into a powder in such a way as to promote the dissolution of the salt in the aqueous mild acid (e.g., vinegar) and/or to facilitate the application of the patina solution through a sprayer having a fine nozzle. In embodiments, the powdered salt has any desired fine particle size, such as about −40 mesh, U.S. standard sieve size. In embodiments, the powdered salt can comprise "popcorn grade" salt. In embodiments, the powdered salt comprises a popcorn grade salt that has a particle size of −60 mesh, U.S. standard sieve size. In embodiments, the powdered salt has a particle size of −200 mesh, U.S. standard sieve size. In embodiments, the powdered salt has a particle size of −325 mesh, U.S. standard sieve size. In embodiments, the powdered salt has a particle size in a range between −60 mesh and +325 mesh, U.S. standard sieve size. In embodiments, the particle size of the salt can be produced using any suitable technique, such as by, grinding or pulverizing, for example.

In embodiments of a patina solution made following principles of the present disclosure, the concentration of the powdered salt in a suitable aqueous acid (e.g., vinegar) can be varied to achieve a desired patina effect. For example, in an embodiment, a patina solution following principles of the present disclosure includes powdered popcorn grade salt and distilled white vinegar. In embodiments, the powdered popcorn grade salt can be added in a suitable concentration up to about one pound of powdered salt per gallon of vinegar.

In embodiments, the patina solution can include any suitable thickening agent configured to help promote the adhesion of the patina solution to the copper surface being treated. For example, in embodiments, the thickening agent can comprise a non-toxic substance, such as, powdered sugar or corn starch, for example. In other embodiments, another thickening agent can be used, as will be appreciated by one skilled in the art.

In embodiments, any suitable concentration of thickening agent can be used to produce the desired viscosity of the patina solution. For example, in an embodiment, a patina solution following principles of the present disclosure includes powdered popcorn grade salt, distilled white vinegar, and a thickening agent in the form of corn starch. In embodiments, the thickening agent (e.g., corn starch) can be added in a suitable concentration between about one-half tablespoon and one tablespoon of corn starch per gallon of vinegar.

In some embodiments, a suitable wetting agent (e.g., a suitable surfactant) can be added to help use the patina solution in a spray applicator. In yet other embodiments, other additives can be included in the patina solution as will be appreciated by one skilled in the art, for example, to adapt the patina solution to the conditions of the particular application and/or to make the color of the patina solution more visually-appealing.

Embodiments of a patina solution made following principles of the present disclosure can be produced via simple processing steps. The patina solution can be made from materials which are non-toxic and easily handled. The patina solution can be produced and stored at ambient temperature. The patina solution can be stored over a long period of several months without detrimental aging effects. Should an ingredient of a batch of the patina solution fall out of solution over time, the batch can be agitated to bring the mixture back into solution.

Embodiments of a patina solution made following principles of the present disclosure can produce a high-quality patina of basic copper compounds which has the visual appearance of a naturally-occurring patina, and is particularly well-suited for application on weathered or partially-patinated copper surfaces. The patina solution can readily be applied in situ, such as, to architectural elements of a home (gutters, roofing, and flashing), for example) to achieve enhanced results with a desirable uniform appearance. In addition, the patina solution can be used to refurbish an existing patina, to modify the color of a patina, or to treat a replacement part to help the replacement part blend in with surrounding elements bearing a patina.

With respect to methods for producing a patina on a surface of an object made of copper or a copper alloy, preferably, the copper surface to be patinated has been oxidized, is partially patinated, or otherwise has been allowed to weather for at least a predetermined amount of time (e.g., at least two to three months) to allow the copper to undergo oxidation. For example, the method can be used to treat a copper surface having a dark brown layer of copper oxide, which is already covered in places with copper salts (patina) (see, e.g., FIGS. 1 and 2).

In embodiments, a method for producing a patina on a surface of an object made of copper or a copper alloy can begin by cleaning the copper surface to be treated. The copper surface to be treated can be cleaned such that dirt and other debris adhering thereto are removed. Such removal can be performed using any suitable technique, such as, by applying water and/or by using mechanical tools, for example. Copper oxides and already existing patina that are present on the surface are preferably not removed. Preferably, the copper surfaces cleaned with water or other cleaning fluids are allowed to dry before applying the patina solution.

The copper surface can be treated with a coating of a patina solution that is made following principles of the present disclosure. The copper surface is preferably treated under dry weather conditions and/or otherwise protected from precipitation by using suitable coverings.

In embodiments following principles of the present disclosure, a patina solution containing an aqueous solution made from a mild acid (e.g., vinegar) and powdered salt is applied to the surface of a copper object after the surface is cleaned. The patina solution can be agitated or stirred shortly before being applied. The application to the copper surfaces can be carried out using a suitable applicator 10, referring to FIG. 4, such as, a brush, roller or spraying device 14, 18 referring respectively to FIG. 6, 7, for example. Preferably, a spraying device is used as the applicator.

Figure 7:
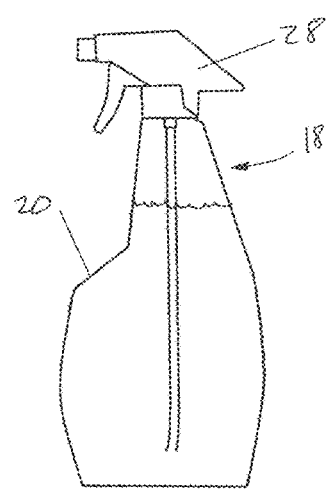
FIG. 7 is a perspective view of another embodiment of a kit for applying a patina solution constructed according to principles of the present disclosure, the kit including a receptacle, an applicator, and a patina solution constructed according to principles of the present disclosure.

In embodiments, any suitable spraying device can be used, such as, a commercially-available backpack sprayer 14, referring to FIG. 7, with a spray wand 16 having a brass spray nozzle, for example. Preferably, the applicator 14 is used to apply a substantially uniform coating of the patina solution using a fine mist spray. Preferably, the patina solution is applied on the copper surface by spraying a fine mist such that drops do not form on the copper surface. It is desirable to avoid the formation of drops on the copper surface being treated or otherwise apply the patina solution such that the patina solution substantially runs from the copper surface being treated. However, overspray and any runoff can be readily cleaned from other objects made from non-copper material, such as, wood siding and asphalt shingles, for example.

The copper surface, which has been treated with the patina solution, is then allowed to interact with the patina solution. An amount of time is allowed to elapse (e.g., 24 hours) in which the coating of the patina solution chemically reacts with the copper surface to produce patina and portions of which mechanically adhere to the copper surface. The reaction time can be adjusted to extend until the patina has hardened. The patina produced according to this process is mechanically stable and has good adhesion to the copper object being patinated. The time required for producing the patina is comparatively short, e.g., about 24 to 48 hours.

The treated copper surface is set by applying water thereto. Residual patina solution can thereby be washed away from the treated copper surface such that the accelerated patination caused by the patina solution substantially stops. If desired, at least one additional patination treatment can be repeated. The treated copper surface bears a patina caused by the patina solution and can continue to further develop more patina naturally.

Figure 4:
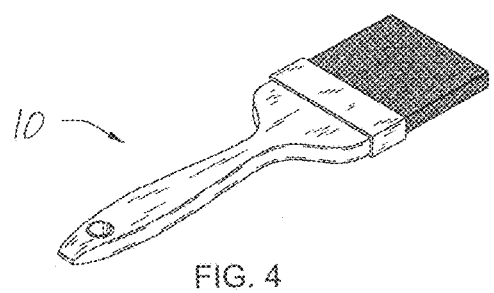
FIG. 4 is a perspective view of an embodiment of an applicator for applying a patina solution following principles of the present disclosure.
Figure 5:
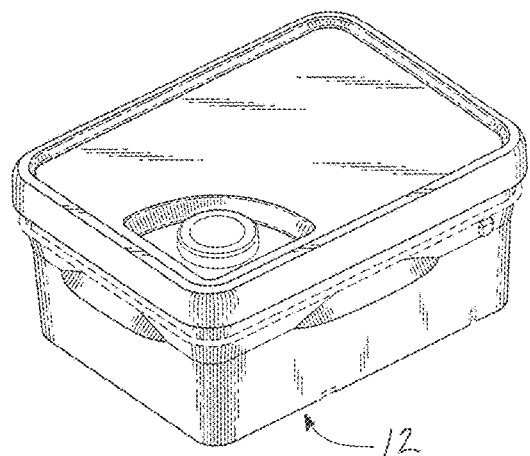
FIG. 5 is a perspective view of an embodiment of a receptacle for containing a patina solution constructed according to principles of the present disclosure.

Embodiments of a patina kit constructed according to principles of the present disclosure can include: a patina solution formulated according to principles of the present disclosure, a suitable receptacle 12, referring to FIG. 5, for storing the patina solution, and a suitable applicator 10, referring to FIG. 4. In embodiments, any embodiment of a patina solution made following principles of the present disclosure can be bundled in an appropriate kit.

In embodiments, the receptacle can be any suitable receptacle. In some embodiments, the receptacle comprises a hand-held spray bottle 20, referring to FIG. 7, (e.g. an eight or ten ounce spray bottle, for example). Such a receptacle may find great utility in applications of the patina solution in an arts and crafts setting. In other embodiments, the receptacle comprises a storage tank 22, referring to FIG. 6, of a sprayer, such as, a backpack sprayer, for instance. The backpack sprayer 14 can be useful in situations where the patination process is being employed to treat a copper architectural element that is installed on a house, for example. In embodiments, the receptacle can be configured to contain an adequate amount of patina solution to allow an operator to apply an application of the patina solution to the entire surface of the object being treated in a continuous pass without having to refill the receptacle.

Figure 6:
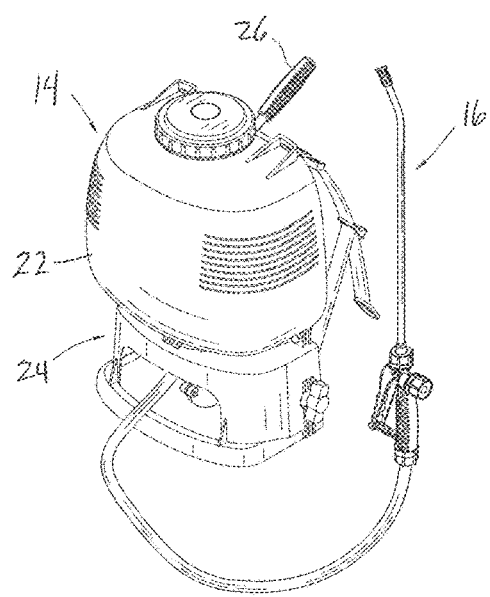
FIG. 6 is a perspective view of an embodiment of a kit for applying a patina solution constructed according to principles of the present disclosure, the kit including a receptacle, an applicator, and a patina solution constructed according to principles of the present disclosure.

In embodiments, the applicator 10, referring to FIG. 4, comprises any suitable applicator, such as, a brush, roller or spraying device 14, 18, referring respectively to FIG. 6 and FIG. 7, for example. Preferably, a spraying device 14, 18 is used as the applicator. In embodiments, any suitable spraying device can be used, such as, a commercially-available backpack sprayer 14 with a spray wand 16 having a brass spray nozzle, for example. In embodiments, the sprayer can include a manually-operated pump 26 configured to pressurize the patina solution stored in the tank 22 of the sprayer 14. In other embodiments, a pump 24 can be supplied that is powered by a power source, such as, a battery pack, for example.

In embodiments, referring to FIG. 7, the receptacle/applicator can comprise any suitable, commercially-available spray bottle 18. The spray bottle 18 can be equipped with a manually-operated spray nozzle 28, such as via a trigger-activated pump. In embodiments, referring to FIG. 6, the receptacle/applicator can comprise any suitable, commercially-available sprayer 14, such as a backpack sprayer with attached spray wand 16, for example. In embodiments, the spray nozzle is made from a material is corrosion resistant and/or is non-reactive with the patina solution.

EXAMPLES

Example 1

For example, referring to FIG. 1, there is shown a view of an architectural element in the form of a gutter downspout that is made from copper. The upper portion of the gutter has been weathered for a period of time and bears a dark brown layer of copper oxide. The lower portion of the gutter has received a single patination treatment using an embodiment of a method of producing a patina on an object made from copper or a copper alloy following principles of the present disclosure. The single patination treatment was completed within a few days. The treated surface bears a patina that looks like a naturally-occurring patina produced over years.

Example 2

Figure 2:
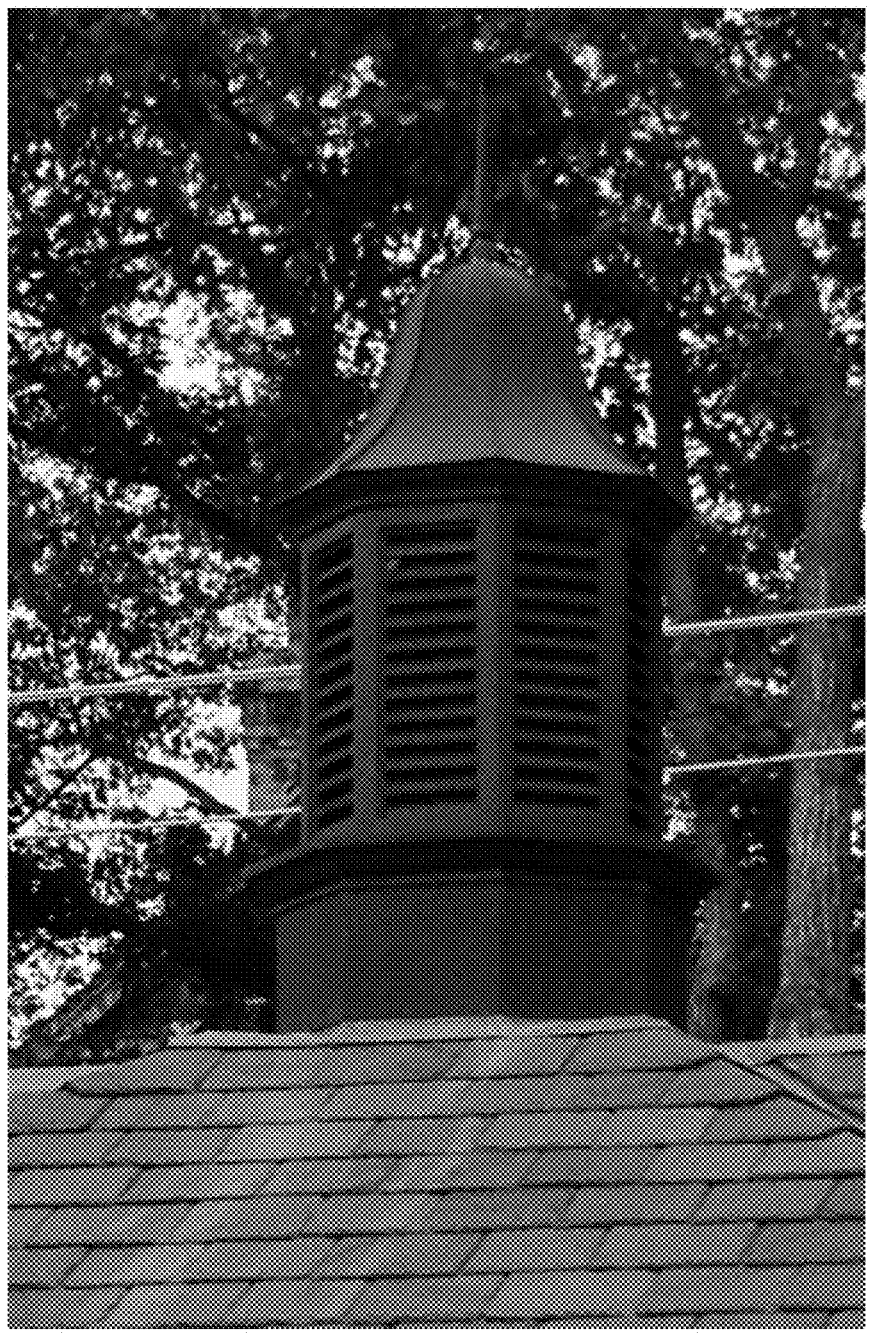
FIG. 2 is a view of an architectural element in the form of a cupola that is made from copper, the cupola having been weathered for a period of time.
Figure 3:
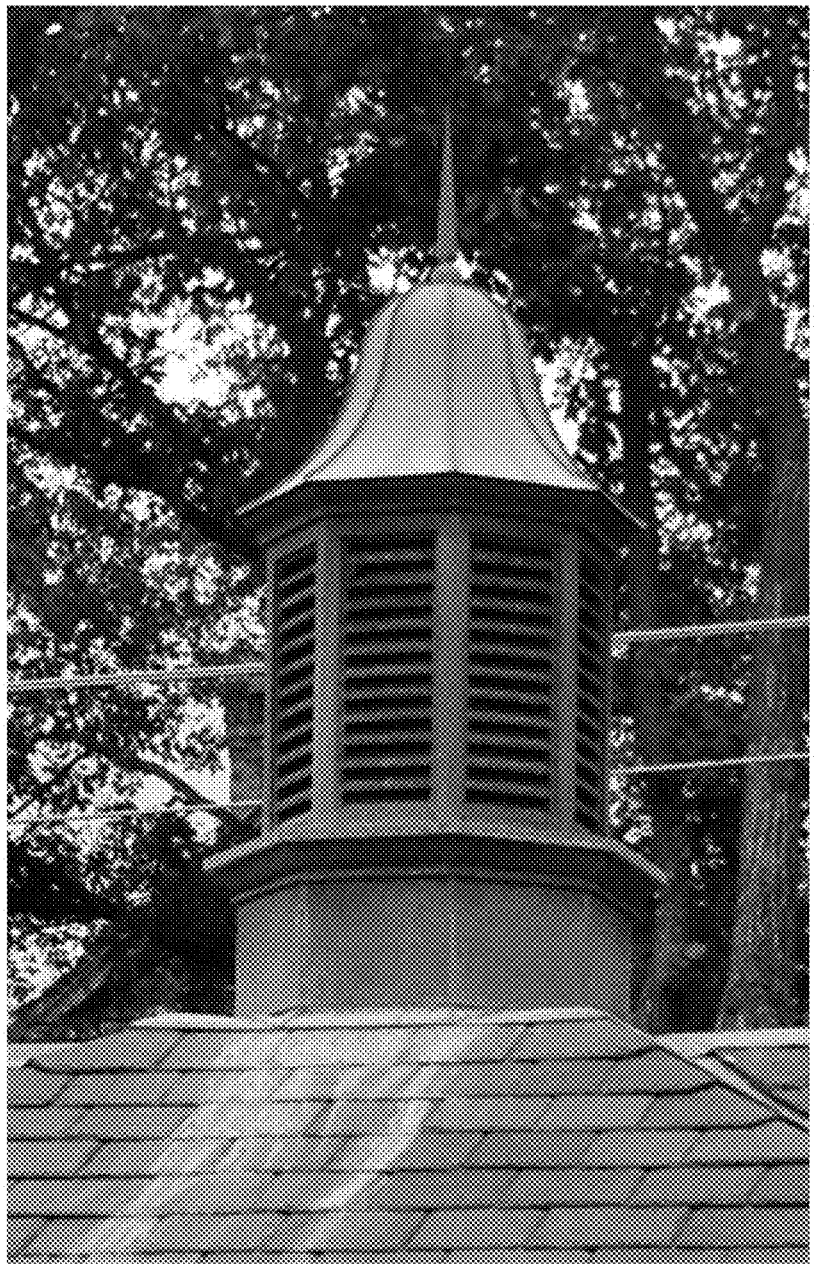
FIG. 3 is a view of the cupola in FIG. 2 after having received two patination treatments using an embodiment of a method of producing a patina on an object made from copper or a copper alloy following principles of the present disclosure.

Referring to FIG. 2, there is shown a view of an architectural element in the form of a cupola that is made from copper. The cupola had been weathered for a period of time and bears a dark brown layer of copper oxide. Referring to FIG. 3, the cupola of FIG. 2 is shown after having received two patination treatments using an embodiment of a method of producing a patina on an object made from copper or a copper alloy following principles of the present disclosure. The process was completed within a week. The treated surface of the cupola bears a patina that looks like a naturally-occurring patina produced over decades.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A composition for forming patina on an object having a surface made of copper or a copper alloy, the composition comprising:
   a mild acid solution; and
   a salt in a concentration of up to about one pound per gallon of mild acid solution, the salt being in powder form when combined with the mild acid solution;
   wherein the salt is powdered such that the powdered salt has a particle size that passes through a 40 mesh U.S. standard sieve.

2. The composition of claim 1, wherein the mild acid solution has a pH between about two and three.

3. The composition of claim 2, wherein the pH of the mild solution is in a range between about 2.3 and 2.6.

4. The composition of claim 2, wherein the mild acid solution comprises vinegar.

5. The composition of claim 4, wherein the vinegar has an acidity by volume in a range between three percent and about seven percent.

6. The composition of claim 1, wherein the salt comprises sodium chloride.

7. The composition of claim 1, wherein the salt is powdered such that the powdered salt has a particle size in a range between −60 mesh and +325 mesh.

8. The composition of claim 1, further comprising a colorant.

9. The composition of claim 1, further comprising a wetting agent.

10. The composition of claim 1, further comprising a thickener.

11. The composition of claim 10, wherein the thickener is at least one of sugar and corn starch.

12. The composition of claim 10, wherein the thickener is added to the composition in a concentration between about one-half tablespoon and one tablespoon per gallon of mild acid solution.

* * * * *